/ 16/85    4,612,241

United States Patent [19]

Howard, Jr.

[11] Patent Number: 4,612,241

[45] Date of Patent: Sep. 16, 1986

[54] IMPACT RESISTANT COMPOSITES WITH ELASTOMERIC FIBERS

[75] Inventor: Edward G. Howard, Jr., Hockessin, Del.

[73] Assignee: E. I. Du Pont de Nemours and Company, Wilmington, Del.

[21] Appl. No.: 743,901

[22] Filed: Jun. 12, 1985

[51] Int. Cl.⁴ .................. B32B 27/02; B32B 27/04; C08K 7/12
[52] U.S. Cl. .................... 428/294; 428/292; 428/394; 428/395; 525/92; 525/93; 525/94; 525/185; 525/190; 525/221; 525/222; 525/408; 525/935
[58] Field of Search .............. 428/395, 290, 394, 292, 428/294; 525/92, 93, 94, 185, 190, 221, 222, 408, 935

[56] References Cited

U.S. PATENT DOCUMENTS

| | | | |
|---|---|---|---|
| 3,686,048 | 8/1972 | Schirtzinger | 156/161 |
| 3,709,754 | 1/1973 | Medlar | 156/161 |
| 3,817,806 | 6/1974 | Anderson et al. | 156/161 |
| 3,855,047 | 12/1974 | Groff | 428/290 |
| 4,124,670 | 11/1978 | Cecka et al. | 264/45.3 |
| 4,541,894 | 9/1985 | Cassat | 428/290 |

*Primary Examiner*—Allan M. Lieberman

[57] ABSTRACT

A composite consisting essentially of a polymer matrix and thermoplastic elastomeric fibers is disclosed. During preparation, elastomeric fibers are embedded in polymer or polymer precursor under from about 0 tension to tension only sufficient to eliminate slack and develop tension as the composite is formed. The composite is impact resistant and capable of elongation.

26 Claims, 2 Drawing Figures

ENERGY-TO-BREAK AND MAXIMUM FORCE FROM INSTRUMENTED IMPACT TESTING OF REINFORCED PMMA AND PMMA OF SEVERAL THICKNESSES.

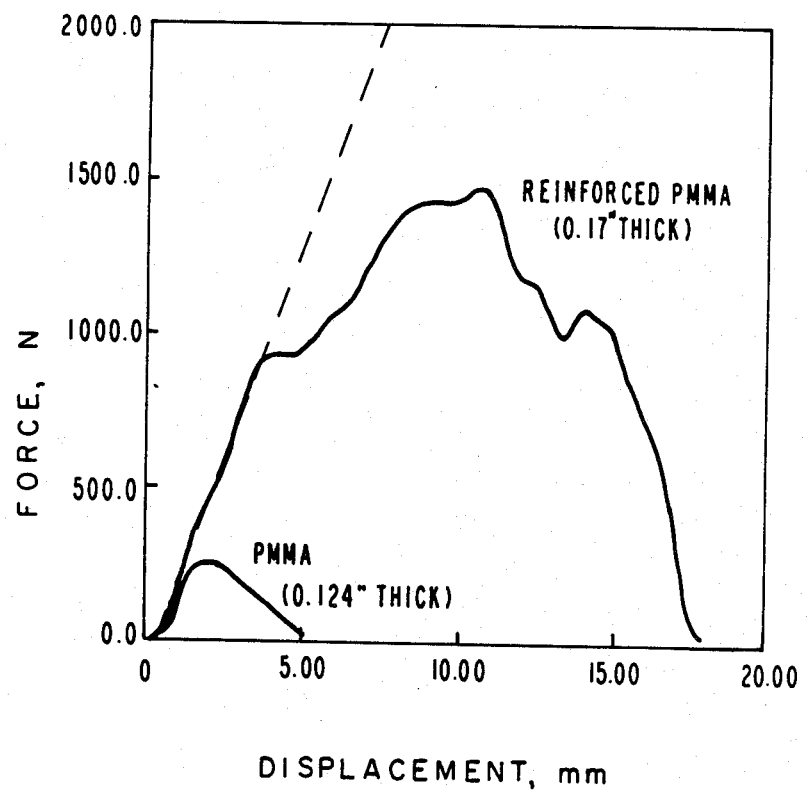

IMPACT RESISTANT COMPOSITES WITH ELASTOMERIC FIBERS

FIELD OF THE INVENTION

This invention relates to an impact resistant composite having improved elongation properties.

BACKGROUND OF THE INVENTION

Many modern plastics lack sufficient strength for use as structural materials. The reinforcement of otherwise unsuitable plastics with fiber of glass, boron, graphite, and metal is known in the art. Reinforced plastics are replacing conventional materials in a variety of applications, including load-bearing structural members. The shift in choice is based on economic advantages, simplified fabrication, freedom from corrosion, and lower weight. One method of preparing reinforced plastics involves embedding tensioned glass fibers in a plastic matrix. The art discloses that reinforced plastics have improved strength and structural integrity. Other important properties not disclosed in the art include impact resistance and elongation properties. The preparation of stronger, lighter materials with impact resistance and elongation properties is a highly desirable objective.

U.S. Pat. No. 3,817,806, issued to Anderson et al., discloses a method for prestressing reinforced thermoset resins. Fibers held under tension are encapsulated with thermosetting resin. The reinforced resin may be formed into rigid structures. The patentees disclose the use of fiberglass fibers with ester based, acid based, or amine based resin. Shaped material prepared by the disclosed method are said to have structural integrity and a tendency to resist deformation.

U.S. Pat. No. 3,709,754, issued to Medler, discloses a method of preparing construction members of glass fibers impregnated with a hardened resin. Layers of glass fiber fabric impregnated with a hardenable resin are wrapped around glass fiber rods bounded together under tension with hardened binder resin. Construction members prepared by the disclosed method demonstrate high strength and resistance to lateral bending and flexing.

U.S. Pat. No. 3,686,048, issued to Schertzinger, discloses a process for preparing multilayer fiber reinforced structures. Parallel fibers are bonded together under tension with a small amount of thermoplastic or thermosetting resin and heated to form a flexible sheet. The sheet comprises a web of fibers connected by resin bridges. A liquid thermoplastic or thermosetting matrix is applied to single or multiple layers of the reinforcing sheets to form fiber reinforced structures. The patentee specifically discloses the preparation of sheets with glass fibers.

U.S. Pat. No. 4,124,670, issued to Cecka et al., discloses a structural member consisting of an expanded formed plastic core and resin-coated graphite fibers. A process for making the structural member is also disclosed. A foam core composition is prepared by blending a resin component, a curing agent, a blowing agent, and a low density filler material. The core composition is formed into an elongated core strip which is wrapped with resin-coated unidirectionally oriented graphite fibers. The core strip is expanded under pressure to form a structural member suitable for tennis racket frames. The structural member demonstrates light weight, high strength, and stiffness.

SUMMARY OF THE INVENTION

The present invention provides an impact resistant composite consisting essentially of a polymer or polymer precursor and oriented thermoplastic elastomeric fibers. The polymer or polymer precursor forms, without the elastomeric fibers, a neat polymer matrix having an elongation of less than about 10%.

The thermoplastic elastomeric fibers are (a) during preparation of the composite, embedded in the polymer or polymer precursor under from about 0 tension to tension only sufficient to eliminate slack, (b) capable of shrinking, and (c) present in the composite in an amount of from about 1 to about 95 percent by weight of composite. The composite has an elongation of at least 10% greater than the elongation of the neat polymer matrix.

BRIEF DESCRIPTION OF FIGURES

FIG. 1 also shows the energy required to break and maximum force from impact testing on polymethyl methacrylate.

FIG. 2 shows the force displacement of polymethyl methacrylate and composites of polymethyl methacrylate and sheath/core oriented polyester/polyether elastomeric fibers.

DETAILED DESCRIPTION OF THE INVENTION

Figure 1:
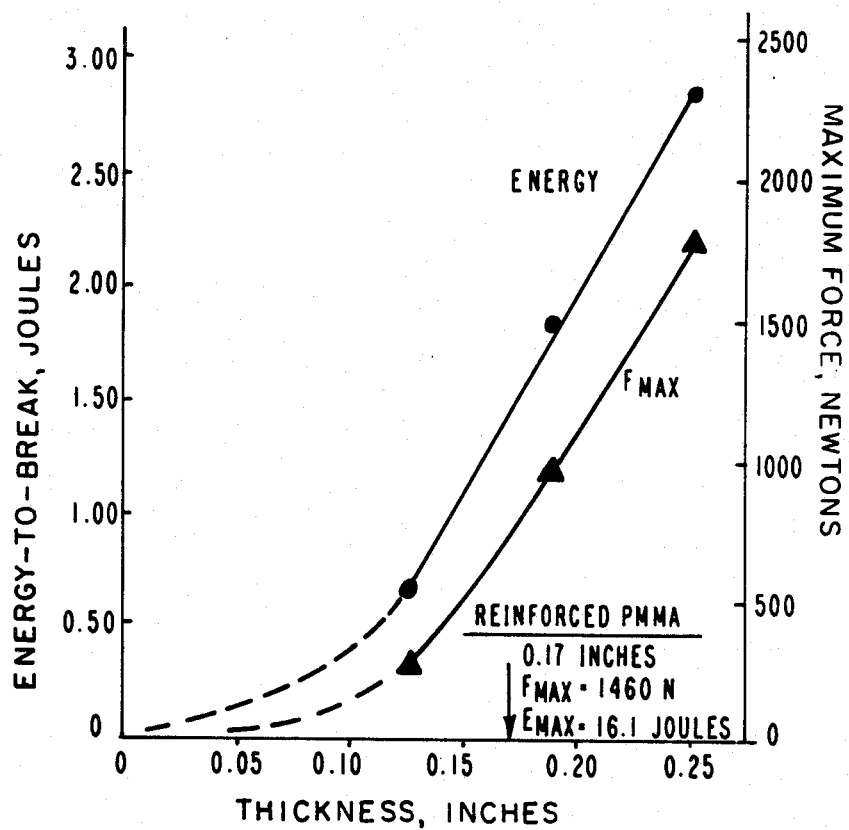
FIG. 1 shows the energy required to break and maximum force from impact testing on composites of polymethyl methacrylate and sheath/core oriented polyester/polyether elastomeric fibers.

The impact resistant composite of the present invention has improved elongation properties and is prepared by embedding thermoplastic elastomeric fibers in a polymer or polymer precursor. The composite is able to tolerate stresses and impacts that would devastate the polymer.

As used herein, the expression "thermoplastic elastomeric fiber" means fibers prepared from thermoplastic polymer that possess elastomeric memory, and become soft and moldable by heat. The expression "neat polymer matrix" means a polymer matrix prepared from a selected polymer or polymer precursor without embedded thermoplastic elastomeric fibers.

The composite of the present invention consists essentially of a polymer matrix and oriented thermoplastic elastomeric fibers. The thermoplastic elastomeric fibers absorb and distribute forces applied to the composite and the polymer matrix serves to maintain shape and to help in distributing forces uniformly to the fibers. A novel aspect of the composite is that the elastomeric fibers are embedded in polymer or polymer precursor under from about 0 tension to tension only sufficient to eliminate slack and develop tension as the composite is formed. Thermoplastic elastomeric fibers suitable for use in the present invention are capable of generating tension from about 0.01 to about 2 g/D. Bonding between the polymer and the fibers allows the fibers to retain tension in the resulting composite. The composite is impact resistant and has an elongation of at least 10% greater than the elongation of the neat polymer matrix, preferably about 60%. The composite elongates as a unit from about 11% to about 200%, preferably from about 60% to about 200%.

In the preparation of the composite of the present invention, thermoplastic elastomeric fibers are arranged under from about 0 tension to tension only sufficient to eliminate slack. Preferably, thermoplastic elastomeric fibers are arranged in a substantially parallel alignment under tension only sufficient to eliminate slack. The fibers can be disposed in one or more layers, having a variety of orientation. In one embodiment, a second layer of parallel fibers is oriented 90° to a first layer of parallel fibers. The resulting fibers are embedded in a polymer or polymer precursor which is then hardened to form the composite of the invention. As used herein, "hardened" means subjected to a treatment capable of transforming a polymer or polymer precursor to a solid polymer matrix. Suitable treatments include polymerizing a polymer precursor or cooling a melted polymer below the polymer's melting point. The fibers embedded in polymer precursor develop tension as the precursor is polymerized. Tension developed in the composite exceeds that necessary to eliminate slack in the free fibers and generally will be at least about 0.01 g/D. In another embodiment, the fibers are embedded in a melted polymer and develop tension as the polymer is cooled below the polymer's melting point. The fibers retain tension in the resulting composite. The fiber content of the resulting composite is from about 1% to about 95% by weight and preferably from about 1 to about 30% by weight. The composite can be prepared in a variety of forms including sheets, blocks, foams, and coated fibers. Sheets of the composite can be heat-formed into curved structures having structural integrity.

In the composite of the present invention, the polymer matrix can be a thermoplastic or thermosetting polymer having an elongation of less than about 10%. Polymer suitable for the composite is compatible with and adhesive to a selected thermoplastic elastomeric fiber. Preferably, the polymer matrix is amorphous or semicrystalline thermoplastic. In another embodiment the polymer matrix is preferably selected from the group consisting of polystyrene, polymethyl methacrylate, cross-linked polymethyl methacrylate, polybutyl methacrylate, thermoplastic and thermoset polyester, copolymer of methyl methacrylate and butyl methacrylate, copolymer of styrene and methyl methacrylate, and epoxy. Most preferably, the polymer matrix is polystyrene or polymethyl methacrylate.

Semicrystalline thermoplastic polymers have greater resistance to solvents and to fatigue than amorphous thermoplastic polymers. The amorphous polymers shrink less in molding which simplifies mold designs. Polymer containing filler substances such as alumina trihydrate, calcium carbonate, silica alumina clays, and silica; crosslinking polyfunctional agents such as ethylene glycol dimethacrylate; and epoxides are also suitable. Crosslinking greatly inhibits the mobility of the polymer matrix. The resulting polymers are infusible and stiff but brittle. Blends of two or more polymers are also suitable for use in the composite of the present invention.

In the composite of the present invention suitable thermoplastic elastomeric fibers are oriented and capable of developing tension when embedded in the polymer or polymer precursor. Suitable thermoplastic elastomeric fibers can be prepared from any polymer that consists of a soft elastomeric section and a hard crystalline segment. A partial list of suitable soft segments includes polytetramethylene oxide, ethylene oxide, and copolymers with propylene oxide and tetrahydrofuran, polydienes, polyaliphatic diacid esters with aliphatic diols. A partial list of suitable hard segments includes methanes, terephthates, isophthates, and polyamides. Fibers suitable for the present invention are compatible with and adhesive to a selected polymer matrix, and are capable of shrinking when heated or exposed to organic solvents or monomers. The melting point of selected fibers should be greater than the temperature required to form the composite. In addition, selected fibers should not be dissolved by the polymer or polymer precursor. Preferred fibers are selected from the group consisting of polyester elastomers, polyester/polyether elastomers, polyamide/polyester/polyether elastomers, polyester/polyurethane elastomers, polytetramethylene terephthalate and polyester/polyurethane elastomers. Most preferably, the fibers are polyester/polyether elastomers. Preferred polyester/polyether elastomers are described in U.S. Pat. Nos. 3,763,109; 3,766,146; and 3,651,014. The polyester/polyether elastomers and polyester/polyurethane elastomers are available commercially from E. I. du Pont de Nemours and Company under the registered trademarks Hytrel ® and Lycra ®. The copolymers of butylene adipate and metaphenylene diisocyanate/butanediol are available commercially from B. F. Goodrich Chemical Co. under the registered trademark Estane ®. Preferably, the elastomeric fibers have a draw ratio of from about 1.2 to 4.5 and individual filaments in the fibers have a denier of about 1 to 10. Combinations of different types of fibers permits the preparation of composites which demonstrate the advantages of each fiber. Sheath/core fibers prepared from combinations of two different elastomers by procedures well-known in the art and hollow elastomers are also suitable.

The invention is further described by the following examples in which all parts and percentages are by weight and degrees are Celsius.

The composite of Examples 1–19 were prepared according to procedures similar to the following general procedure. The composites of Examples 21–30 were prepared as polymer coated fibers.

GENERAL PROCEDURE

Metal frames are prepared by removing the center portion of a metal sheet leaving about 4 cm on each side. The metal frames used in the Examples measured 15 cm by 15 cm or 9 cm by 9 cm. Thermoplastic elastomeric fibers are wound around the frame in substantially parallel alignment under tension only sufficient to eliminate slack. Fibers can be wound around the frame in substantially parallel alignment under similar tension oriented 90° to other fibers on the frame. An assembly is prepared using tempered glass plates separated 0.5 cm by a plasticized polyvinyl chloride gasket and held together with clips. The frame is placed between the glass plates of the assembly. Several frames can be included in the assembly with similar or varying orientations. The assembly is placed in a vacuum chamber which is evacuated for a period sufficient to dry the fibers and allow the escape of any trapped gas.

A monomer-catalyst (about 250:1) mixture is placed in a suction flask which is fitted with a stopper penetrated by a glass tube which extends to the bottom of the flask. Polyethylene tubing is attached to the glass tube and inserted between the glass plates of the assembly. The flask is placed in the vacuum chamber which is evacuated to degas the monomer-catalyst mixture. The flask is then cautiously pressurized with nitrogen, forcing the monomer-catalyst mixture into the assembly.

The vacuum chamber is brought to atmospheric pressure, the tubing is removed, and the assembly is sealed. The mixture is then heated to effect the polymerization of the monomer. Polymerization is conducted at a temperature of from about 30° to 150° depending on the selected monomer-catalyst mixture. Alternatively, melted polymer can be placed into an extruder, forced into the assembly, and cooled to form a composite. The composite is removed from the frame by sawing around the inner edge of the frame. Sawing can cause cracks to develop in the edges of the composite around embedded fibers. These cracks can have a negative effect on the composite's elongation properties. It has been found that sealing the cracks with a solution of polymer in solvent, such as polymethyl methacrylate in chloroform, restores the composite's improved elongation properties.

Test bars are prepared by sawing the composite into tensile bars of ASTM Type 5 and Izod impact bars. Tensile properties were determined according to ASTM No. 638 and impact resistance was determined according to ASTM No. 256. All physical tests were conducted according to ASTM specifications. Tensile properties and impact resistance shown for polymethyl methacrylate, polystyrene and epoxy were obtained from *Guide to Plastics*, 1980 (McGraw Hill, New York, N.Y., 1979). All values in the Examples are normalized. The composite's fiber content is calculated from the weight of fibers in each composite divided by the weight of the composite. Composites in Examples 1-29 have a density of about 1.2 g/mL.

EXAMPLE 1

A composite was prepared using oriented polyester/polyether elastomeric fibers and a matrix of polystyrene. Polyester/polyether elastomeric fibers, prepared from a polymer sold commercially by E. I. du Pont de Nemours and Company (Du Pont) under the registered trademark Hytrel ® 7246, were wound around a metal frame in substantially parallel alignment under tension only sufficient to eliminate slack. The fiber-wrapped frames were embedded in a mixture of styrene monomer and a free-radical catalyst, sold commercially by Du Pont under the registered trademark Vazo ® 52. The resulting combination was heated at 45° for 16 hours to form a composite. Physical properties of the composite and polystyrene are shown in Table 1.

TABLE 1

|  | POLYSTYRENE* | COMPOSITE |
|---|---|---|
| Fiber Content % | 0.0 | 15 |
| Thickness in | n.a. | 0.195 |
| (cm) |  | 0.495 |
| Tensile Strength psi | 5300-7900 | 6420 |
| (MPa) | (36-54) | (44) |
| Tensile Modulus kpsi | 350-485 | 237 |
| (MPa) | (2410-3340) | (1634) |
| Elongation % (to break) | 1-2 | 65 |
| Izod Impact ft lb/in of notch | 0.25-0.4 | 9 |
| (N/m) | (43.8-70.0) | 1576 |

*Tensile Properties and Izod Impact from Guide to Plastics, 1980, page 23.
n.a. — not available

EXAMPLES 2-4

Three composites were prepared using polymethyl methacrylate as a matrix and oriented thermoplastic elastomeric fibers of different compositions. One fiber composition was made of a copolymer of polyamylactam, poly(tetramethylene ether)glycol, and dodecandioic acid. Another was made of a copolymer of butylene adipate and meta-phenylene diisocyanate/butanediol, while the third, a polyester/polyether elastomeric fiber, was prepared from a polymer sold commercially by Du Pont under the registered trademark Hytrel ® 7246. Each fiber was wound around a metal frame in substantially parallel alignment under tension only sufficient to eliminate slack. The fiber-wrapped frames were embedded in a mixture of methyl methacrylate monomer and a free-radical catalyst similar to that of Example 1. The resulting combination containing the polyester/polyether elastomeric fibers was heated at 45° for 16 hours to form the composite of Example 2. The resulting combination containing the copolymer of butylene adipate and meta-pheylene diisocyanate/butanediol was heated at 45° for 18 hours to form the composite of Example 3. The resulting combination containing the copolymer of polylaurylactam/poly(tetramethylene ether)glycol/dodecandioic acid was heated at 55° for 20 hours, followed by heating at 75° C. for 3 hours, followed by heating at 100° for 2 hours to form the composite of Example 4. Physical properties of the three composites and polymethyl methacrylate are shown in Table 2.

TABLE 2

| Material Tested | PMMA* | Example 2 | Example 3 | Example 4 |
|---|---|---|---|---|
| Fiber Content (%) | 0.0 | 20.0 | 10.2 | 10.2 |
| Thickness, in | n.a. | 0.157 | 0.145 | 0.153 |
| (cm) |  | 0.399 | 0.368 | 0.389 |
| Tensile Strength |  |  |  |  |
| psi | 7-11000 | 12000 | 9000 | 6500 |
| (Mpa) | (48-76) | (83) | (62) | (45) |
| Elongation to break | 2-10 | 84 | 17 | 100 |
| Izod Impact |  |  |  |  |
| ft/lb in | 0.3-0.5 | 18.0 | 1.8 | 4.0 |
| (N/m) | (52.5-87.6) | (3152.3) | (315.2) | (700.5) |

*Tensile Properties and Izod Impact from Guide to Plastics, 1980, page 6.
n.a. — not available

EXAMPLE 5

This example shows that hollow oriented thermoplastic elastomeric fibers impart impact resistance properties to composites. A composite was prepared from hollow polyester/polyether elastomeric fibers and polymethyl methacrylate matrix. The hollow polyester/polyether elastomeric fibers were made from a polymer, sold commercially by Du Pont under the registered trademark Hytrel ® 4766. The fibers were wound around a metal frame in substantially parallel alignment under tension only sufficient to eliminate slack. The fiber-wrapped frame was embedded in a mixture of methyl methacrylate monomer and a free radical catalyst, sold commercially by Du Pont under the trademark Vazo ® 64. The resulting combination was heated at 50° for 20 hours, followed by heating at 75° for 4 hours to form a composite. The physical properties of the composite are shown in Table 3.

TABLE 3

| Physical Property | Value |
|---|---|
| Fiber Content, % | 25 |
| Thickness in | 0.122 |
| (cm) | (0.310) |

TABLE 3-continued

| Physical Property | Value |
| --- | --- |
| Tensile Strength, psi | 7450 |
| (MPa) | (51) |
| Tensile Modulus (i) kpsi | 290 |
| (MPa) | (2000) |
| Elongation (break) % | 95 |
| Izod Impact, ft lb/in | 40 |
| (N/m) | (7005) |

EXAMPLE 6

A composite was prepared using oriented polytetramethylene terephthalate fibers and a matrix of polymethyl methacrylate. Threads consisting of 5 polytetramethylene terephthalate filaments and having a denier of 22 were wound around a metal frame in substantially parallel alignment under tension only sufficient to eliminate slack. The fiber-wrapped frame was embedded in a mixture of methyl methacrylate monomer which contained 0.4% t-butylperoctoate initiator. The resulting combination was heated at 45° for 16 hours, then at 70° for 1 hour to form a composite. Physical properties of two pieces of the composite are shown in Table 4.

TABLE 4

| Physical Property | Composite | Composite |
| --- | --- | --- |
| Fiber Content | 10.5% | 10.5% |
| Tensile Strength, psi | 11,900.0 | 12,300.0 |
| (MPa) | (82.0) | (84.8) |
| Thickness in | 0.132 | 0.139 |
| (cm) | (0.335) | (0.353) |
| Modulus(initial), kpsi | 476.5 | 482.9 |
| (MPa) | (3285.0) | (3329.0) |
| Elongation (break), % | 42.5 | 42.5 |
| Izod Impact, ft lb/in | 8.1 | 7.6 |
| (N/m) | (1418.5) | (1331.0) |

EXAMPLES 7-8

Composites were prepared using oriented polyester elastomeric fibers, available commercially from Celanese Fibers Marketing Co. under the registered trademark Fortrel®. One set of elastomeric fibers was drawn 1.5 to 1.9 times. Both sets of fibers were wound around metal frames in substantially parallel alignment under tension only sufficient to eliminate slack. The fiber-wrapped frames were embedded in a mixture of methyl methacrylate monomer, containing 0.4% t-butylperoctoate initiator. The resulting combination containing the undrawn fiber was heated at 65° for 20 hours and at 85° for 2 hours to form a composite. The resulting combination containing the drawn fiber was heated at 55° for 20 hours and at 100° for 2.1 hours to form a composite. Physical properties of the two composites are given in Table 5.

TABLE 5

|  | Example 7 | Example 8 (Drawn) |
| --- | --- | --- |
| Filament number | 66 | 66 |
| Denier | 350 | 230 |
| Fiber Content, % | 22.7 | 27.7 |
| Thickness in | 0.145 | 0.146 |
| (cm) | 0.368 | 0.371 |
| Tensile Strength, |  |  |
| psi | 9500 | 10,000 |
| (MPa) | (65.5) | (68.9) |
| Modulus (i) |  |  |
| kpsi | 440 | 320 |
| (MPa) | (3033.7) | (2206.3) |
| Elongation, % | 11 | 80 |
| Izod. ft lb/in | 2.8 | 4.5 |
| (N/m) | (440.3) | (788.1) |
| of notch |  |  |

EXAMPLES 9-11

Composites were prepared using oriented polyester/polyether elastomeric fibers and a matrix of polymethyl methacrylate containing ethylene glycol dimethacrylate as a crosslinking agent. Polyester/polyether elastomeric fibers similar to those of Example 1 were wound around three metal frames in substantially parallel alignment under tension only sufficient to eliminate slack. The fiber-wrapped frames were embedded in mixtures of methyl methacrylate monomer containing 1, 3, and 5% ethylene glycol dimethacrylate and a free-radical catalyst similar to that of Example 5. The resulting combinations were heated at 45° for 16 hours to form composites. Physical properties of the three composites are shown in Table 6.

TABLE 6

| Physical Property | Example 9 1% EGD* | Example 10 3% EGD* | Example 11 5% EGD* |
| --- | --- | --- | --- |
| Fiber Content % | 22.9 | 24.0 | 22.3 |
| Thickness in | 0.140 | 0.134 | 0.144 |
| (cm) | 0.356 | 0.340 | 0.366 |
| Tensile Strength, psi | 11,000 | 10,000 | 10,000 |
| (MPa) | (76) | (72) | (72) |
| Flex Strength, psi | 11,500 | 10,100 | 11,000 |
| (MPa) | (79) | (70) | (76) |
| Flex Strength, kpsi | 380 | 316 | 340.0 |
| (MPa) | (2620) | (2180) | (2340) |
| Elongation (break), % | 83 | 58 | 59.0 |
| Izod Impact, ft lb/in | 35 | 23 | 6.7 |
| (N/m) | (6129.4) | (4027.9) | (1173.3) |

EGD* = Ethylene glycol dimethacrylate

EXAMPLES 12-13

Composites were prepared using oriented polyester/polyether elastomeric fibers and a polymethyl methacrylate matrix. Hollow polyester/polyether elastomeric fibers were prepared according to a procedure similar to that of Example 5. One set of fibers was drawn 1.85 times. Both sets of fibers were wound around metal frames in substantially parallel alignment under tension only sufficient to eliminate slack. The fiber-wrapped frames were embedded in a mixture methyl methacrylate monomer and a free-radical catalyst similar to that of Example 1. The resulting combinations were heated at 45° for 16 hours to form composites. Characteristics of the two fibers are given in Table 7. Physical properties of the composites and polymethyl methacrylate are given in Table 8.

TABLE 7

|  | Example 12 | Example 13 (Drawn Fiber) |
| --- | --- | --- |
| Draw Ratio | 0.0 | 1.85 |
| Denier | 170 | 123 |
| Tenacity, g/D | 1.3 | 2.0 |
| Elongation, % (to break) | 175 | 66 |
| Modulus, g/D | 1.26 | 1.03 |
| Toughness, g/D | 1.33 | 0.59 |

TABLE 8

| Material Tested | PMMA* | Example 12 | Example 13 |
|---|---|---|---|
| Fiber Content (%) | 0.0 | 17.6 | 21.5 |
| Thickness in (cm) | n.a. | 0.171 (0.434) | 0.141 (0.358) |
| Tensile Strength psi (MPa) | 7–11000 (48–76) | 7500 (52) | 12000 (84) |
| Elongation (to break) | 2–10 | 120 | 130 |
| Izod Impact ft lb/in of notch (N/m) | 0.3–0.5 (57.5–87.6) | 2.1 (367.8) | 48 (8406.1) |

*Tensile Properties and Izod Impact from Guide to Plastics, 1980, page 6.
n.a. — not available

EXAMPLE 14

This Example demonstrates how much energy a composite can absorb in a destructive impact test. A composite was prepared using sheath/core oriented polyester/polyether elastomeric fibers and a polymethyl methacrylate matrix. The sheath/core fibers were prepared by well-known procedures. The sheath of a polyester/polyether elastomer, prepared from a polymer sold commercially by Du Pont under the registered trademark Hytrel ® 5555, comprised 15% of the fiber. The core of a polyester/polyether elastomer similar to that of Example 1 comprised 85% of the fiber. The sheath/core fibers were wound around a metal frame in substantially parallel alignment under tension only sufficient to eliminate slack. A second layer of fiber was wound around the frame in substantially parallel alignment under similar tension oriented 90° to the first layer of fibers on the frame. The resulting structure was embedded in a mixture of methyl methacrylate monomer and a free-radical catalyst similar to that of Example 1. The resulting combination was heated at 45° for 18 hours to form a composite. The piece of composite tested was 0.17 inches (0.43 cm) thick and contained 16% fiber.

The energy required to break the composite when impacted with 10.4 joules of impact energy was 16.1 joules. The amount of energy required to break the same thickness of polymethyl methacrylate was 1.5 joules. Thus, the composition withstood more than 10.7 times more impact energy than polymethyl methacrylate before breaking. The maximum force generated during the impact testing was 800 Newtons for the polymethyl methacrylate and 1460 Newtons for the composite. Also, in a force-displacement, as shown in FIG. 1, considerably more energy was required to break the composite than the polymethyl methacrylate. This difference is reflected in the area under the curves in FIG. 2.

EXAMPLE 15

This Example demonstrates the impact resistance of a composite when impact force is applied at various angles to the embedded fiber. Oriented polyester/polyether elastomeric fibers similar to those of Example 1 were wound around a metal frame in substantially parallel alignment under tension only sufficient to eliminate slack. The fiber-wrapped frame was embedded in a mixture of methyl methacrylate monomer and a free-radical catalyst similar to that of Example 1. The resulting combination was heated at 45° for 18 hours to form a composite with a fiber content of 21% and elongation of 82.5%. Test bars were cut so that the fibers were oriented 30, 40, and 60 degrees in relation to the lengthwise axis of the bars. One test bar was cut with fibers parallel to the lengthwise axis of the bar. The Izod impact test was done with fibers oriented toward and away from the impact force. The results are given in Table 9.

TABLE 9

| MATERIAL TESTED | FIBER ANGLE | FT LB/IN AT NOTCH (N/m) | FT LB/IN AT NOTCH (N/m) |
|---|---|---|---|
| PMMA | no fiber | 0.3–0.5 | |
| | | *FTH | *FAH |
| Composite | 0 degrees | 12.0 (2101.5) | 12.0 (2101.5) |
| Composite | 30 degrees | 11.6 (2031.5) | 6.4 (1120.8) |
| Composite | 45 degrees | 8.3 (1453.5) | 2.1 (367.8) |
| Composite | 60 degrees | 2.5 (437.8) | 1.5 (262/7) |

*FTH = fibers oriented upward toward notch
*FAH = fibers oriented downward away from notch

EXAMPLE 16-17

The following Examples demonstrate that composites of this invention can withstand bending deformity that shatters the neat matrix polymer. Two composites were prepared from oriented polyester/polyether elastomeric fibers similar to those of Example 1 and a matrix of polymethyl methacrylate. The fibers had a denier of 216 and a draw ratio of 2.5 to 3. One composite, designated "Example 16", contained a single layer of fibers (0° orientation) and the other composite, designated "Example 17", contained two layers of fibers with one layer oriented 90 degrees to the other (0°, 90° orientation). The fibers were wound around two metal frames in substantially parallel alignment under tension only sufficient to eliminate slack. Additional fibers were wound around one of the frames in substantially parallel alignment under similar tension oriented 90° to other fibers on the frame. The fiber-wrapped frames were embedded in methyl methacrylate monomer and a free-radical catalyst similar to that of Example 1. The resulting combinations were heated at 45° for 18 hours to form composites. The fiber content of Example 16 and Example 17 were 20.4% and 23.4%, respectively. Test bars 1 inch (2.5 cm) long by ½ inch (1.3 cm) wide were cut from the composites. Each test bar was supported at the ends by small cylinders. Downward pressure was applied to the middle of the bar by means of a rounded tool. The amount of deformation was determined by measuring the distance between the lowest point of the bar at its center and the highest point of the bar at the ends. After the pressure was removed, the amount of permanent deformation was measured. Test bars were examined visually for cracks. The results are shown in Table 10.

When polymethyl methacrylate was deformed by 3.0 mm, the polymer shattered. When deformed by 2.3 mm, the polymer retained 0.3 mm of deformation after the pressure was removed. The composite containing fibers oriented in one direction did not shatter when deformed 7.6 mm. When the pressure was removed, the composite retained 2.1 mm of deformation. No cracks or evidence of stress was detected. The composite containing fibers oriented in two directions did not shatter when deformed 7.6 mm and retained only 0.3 mm of deformation when the pressure was removed. The composite did have small cracks.

TABLE 10

| Material Tested | PMMA* | PMMA* | Example 16 (0° orientation) | Example 17 (0°, 90° orientation) |
|---|---|---|---|---|
| Thickness, in | 0.170 | 0.130 | 0.154 | 0.160 |
| (cm) | (0.432) | (0.330) | (0.391) | (0.406) |
| Elongation, % (to break) | 2–10 | 2–10 | 84 | 37 |
| Izod Impact ft lb/in of notch (N/m) | 0.3–0.5 (52.5–87.6) | 0.3–0.5 (52.5–87.6) | 18.6 (3257.3) | 4.3 (753.0) |
| Short-Beam Shear, psi | 2100 | 1980 | 2450 | 1800 |
| (MPa) | (14.5) | (13.6) | (16.9) | (12.4) |
| Test Deformity, mm | 3.0 | 2.3 | 7.6 | 7.6 |
| Observation | shattered | No cracks | No cracks | Small cracks |

*Tensile Properties and Izod Impact from Guide to Plastics, 1980, page 6.

EXAMPLE 18

This Example illustrates that composites of the invention elongate as a unit and break as a unit when subjected to elongation stresses. A composite was prepared from thermoplastic polyester/polyether elastomeric fibers similar to those of Example 1 and a polymethyl methacrylate matrix. The composite was prepared according to a procedure similar to that of Example 1. The composite contained 21.5% fiber. Bars of the composite were cut with the dimension of 5 in × ½ in × ⅛ in (12.7 cm × 1.3 cm × 0.3 cm). The fibers in the bars were parallel to the long axis. The bars were mounted in an Instron tester and pulled at a rate of 0.2 in (0.5 cm) per minute. The elongation of the center region of the bars was measured as the tension was increased. The results of one test are shown in Table 11. Several cracks started at the edge of the bar but stopped when they neared an embedded fiber. The final failure was a clean break. No fibers pulled out or were delaminated.

TABLE 11

| Composite Under Tension Instron | | | |
|---|---|---|---|
| | Tension psi (MPa) | % Elongation (Instron) | % Elongation (bar center) |
| 1 | 4760 (33) | 20 | 14.7 |
| 2 | 5060 (35) | 40 | 28.6 |
| 3 | 5060 (35) | 50 | 31.5 |
| 4 | 5000 (34) | 80 | 41.6 |
| 5 | 5600 (39) | 100 | 48.4 |
| 6 | 6100 (42) | 120 | 57.7 |
| 7 | 6400 (44) | 140 | 67.2 |
| 8 | 6500 (45) | 153 | 80.0 |

The cross section dimensions at the start were 0.147 by 0.50 inch (0.373 by 1.27 cm): after the break they were 0.125 by 0.41 inch (0.317 by 1.04 cm).

EXAMPLE 19

A composite was prepared from sheath/core oriented thermoplastic elastomeric fibers in a polymethyl methacrylate matrix. The fibers contained a sheath of a thermoplastic elastomeric fiber prepared from a polymer sold commercially by Du Pont under the registered trademark Hytrel ® 5555 and a core of a fiber similar to that of Example 1. The resulting fibers contained 15% sheath and 85% core and had a draw ratio of 4.0. The fibers were wound around three metal frames in substantially parallel alignment under tension only sufficient to eliminate slack. The fiber-wrapped frames were placed inside a plastic bag. Methyl methacrylate monomer and a free-radical catalyst similar to that of Example 1 were poured into the bag. The resulting combination was heated for about 16 hours at a temperature of 55° to form a composite. The physical properties of the composites and polymethyl methacrylate are shown in Table 12.

TABLE 12

| | PMMA* | COMPOSITE |
|---|---|---|
| Fiber content % | 0 | 19.5 |
| Thickness in (cm) | n.a | 0.139 0.353 |
| Tensile Strength, psi (MPa) | 7–11,000 (48–76) | 9200 (63) |
| Tensile Modulus (i) kpsi (MPa) | 350–400 (2410–2760) | 235 (1620) |
| Elongation, % (to break) | 2–10 | 76 |
| Izod Impact ft lb/in of notch (N/m) | 0.3–0.5 (52.5–87.6) | 9.3 (1628.7) |

*Tensile Properties and Izod Impact from Guide to Plastics, 1980, page 6.
n.a. — not available

EXAMPLES 20–23

Composites were prepared from polyester/polyether elastomeric fibers uniformly coated with polymethyl methacrylate. Thermoplastic elastomeric fibers similar to those of Example 1 having 820 denier and a draw ratio of 2.5 to 3.0 were wound about a narrow metal frame in substantially parallel alignment under tension only sufficient to eliminate slack. The frame and fibers were placed in a 2-liter graduated cylinder. After the inside of the cylinder was wetted with methylene chloride, the fibers were coated with a 10% solution of polymethyl methacrylate in methylene chloride. The cylinder was sealed for 30 minutes and then placed on its side and the methylene chloride was allowed to evaporate completely. The physical properties of the four composites and an uncoated polyester elastomer are shown in Table 13.

TABLE 13

| Material Tested | % PMMA | Denier | Tenacity (g/D) | Elongation (max), % | Modulus (g/D) |
|---|---|---|---|---|---|
| Polyester elastomer | 0 | 892 | 2.44 | 93.5 | 11.9 |
| Example 20 | 31 | 1293 | 1.86 | 89.3 | 14.4 |
| Example 21 (heated) | 30 | 1215 | 2.00 | 88.6 | 13.6 |
| Example 22 | 5 | 949 | 2.36 | 110.5 | 12.5 |
| Example 23 (heated) | 5 | 951 | 2.33 | 97.6 | 11.0 |

Composites of Examples 20–23 differed by PMMA content and whether or not they were heated. Heating was 120° C. for 3 minutes.

EXAMPLES 24

Composites were prepared from two polyester/polyether elastomeric fibers coated with epoxide resin. fibers were prepared from polymer similar to that of Example 1 and had 459 denier. The composite was prepared according to a procedure similar to that of Examples 20–23, except the fibers were coated with a solution containing epoxide resin and heated. The solution was prepared by adding 90 grams of methylene dianiline and 210 grams of epoxy resin, sold commercially by Shell Oil Co. under the registered trademark Epon ®, to 90 mL of methylene chloride. After the fibers were coated, they were air dried and heated at 110° for 6 hours to form a composite that contained 38% epoxy coating. The composite was subjected to elongation testing on an Instron Model 1130 Tensile-Tester. Epoxy has an elongation of 3–6%.* Physical properties of the composite and an uncoated polyester elastomeric fiber are shown in Table 14.

TABLE 14

| PHYSICAL | FIBER | |
|---|---|---|
| PROPERTY | 7246 | EXAMPLE 26 |
| Tenacity, g/D | 5.0 | 2.86 |
| Max Elongation, % | 103.4 | 57.50 |
| Modulus, g/D | 49.7 | 29.60 |
| Toughness, g/D | 6.3 | 1.20 |

*Elongation from Guide to Plastics, 1980, page 9.

EXAMPLE 25

A composite was prepared from polyester/polyether elastomeric fibers uniformly coated with cross-linked epoxy. Polyester/polyether elastomeric fibers similar to those of Example 1 with denier of 810 and containing 136 filaments were passed through a solution of 100 g of epoxy resin similar to that of Example 24, and 30 g of triethylamine. The resulting fibers were looped around a split mandrel. Excess resin was allowed to flow off the mandrel. The resulting combination was heated at 75° for 4 hours to form a loop of composite. The composite had a fiber content of 66% and a thickness of 0.118 inch (0.3 cm). The loop was pulled to 20% elongation for 24 hours. The stress delay of the loop of composite is shown in Table 15.

TABLE 15

| TIME | TENSION | |
|---|---|---|
| (hours:minutes) | psi | (MPa) |
| 0:00 | 7200 | (50) |
| 0:20 | 6800 | (47) |
| 1:30 | 6250 | (43) |
| 5:00 | 4750 | (33) |
| 24:00 | 4450 | (31) |

EXAMPLE 26

A loop of composite was prepared according to a procedure similar to that of Example 25. The composite had a fiber content of 68% and a thickness of 0.090 inch (0.229 cm). The loop was extended to break at an elongation of 33% at a tension of 14,500 psi (100 MPa). Epoxy has an elongation of 3–6%.* The tensile modulus of the composite was about 700,000 psi (4826 MPa).
*Elongation from Guide to Plastics, 1980, page 9.

The invention being claimed is:

1. An impact resistant composite consisting essentially of a polymer or polymer precursor and oriented thermoplastic elastomeric fibers:
   said polymer or polymer precursor being compatible with and adhesive to said thermoplastic elastomeric fibers, and forming, without said thermoplastic elastomeric fibers, a neat polymer matrix having an elongation of less than about 10%;
   said thermoplastic elastomeric fibers being (a) during preparation of said composite, embedded in said polymer or polymer precursor under from about 0 tension to tension only sufficient to eliminate slack, (b) capable of developing tension when embedded in said polymer or polymer precursor, and (c) present in said composite in an amount of from about 1 to about 95 percent by weight of composite; and
   said composite having an elongation of at least 10% greater than the elongation of the neat polymer matrix.

2. A composite of claim 1 wherein the polymer is thermoplastic.

3. A composite of claim 1 wherein the polymer is selected from the group consisting of polystyrene, polymethyl methacrylate, cross-linked polymethyl methacrylate, polybutyl methacrylate, thermoplastic and thermoset polyester, copolymer of methyl methacrylate and butyl methyl methacrylate, copolymers of styrene and methyl methacrylate and epoxy resin.

4. A composite of claim 1 wherein the polymer is selected from the group consisting of polystyrene, polymethyl methacrylate, and cross-linked polymethyl methacrylate.

5. A composite of claim 4 wherein thermoplastic elastomeric fibers are arranged in substantially parallel alignment in at least one direction.

6. A composite of claim 5 wherein the thermoplastic elastomeric fibers are embedded in the polymer or polymer precursor during the preparation of said composite under tension only sufficient to eliminate slack.

7. A composite of claim 6 wherein the oriented thermoplastic elastomeric fibers are disposed in one or more layers.

8. A composite of claim 7 wherein the thermoplastic elastomeric fibers are selected from the group consisting of polyester elastomers, polyester/polyether elastomers, polyamide/polyester/polyether elastomers, polyester/polyurethane elastomers, polytetramethylene terephthalate, and polyester/polyurethane elastomers.

9. A composite of claim 8 wherein the elastomeric fibers have a draw ratio of from about 1.2 to 4.5.

10. A composite of claim 8, wherein the composite has an elongation of at least about 60% greater than the elongation of the neat polymer matrix.

11. A composite of claim 8, wherein the composite has an elongation from about 11% to about 200%.

12. A composite of claim 11, wherein the composite has an elongation from about 60% to about 200%.

13. A composite of claim 9 wherein the polymer is polystyrene or polymethyl methacrylate.

14. A composite of claim 13 wherein the thermoplastic elastomeric fibers are polyester/polyether elastomers.

15. A composite of claim 8 wherein the thermoplastic elastomeric fibers are sheath/core fibers of two elastomers.

16. A composite of claim 8 wherein the thermoplastic elastomeric fibers are hollow.

17. A composite of claim 8 having a second layer of parallel thermoplastic elastomeric fibers oriented 90 degrees to a first layer of parallel elastomeric fibers.

18. A composite of claim 17 having 3 or more layers of thermoplastic elastomeric fibers.

19. A composite of claim 8 wherein the thermoplastic elastomeric fibers are present in the composite in an amount of from about 2 to about 30 percent by weight of composite.

20. A composite of claim 19 wherein the thermoplastic elastomeric fibers are present in the composite in an amount of from about 10 to about 30 percent by weight of composite.

21. A process for preparing an impact resistant composite consisting essentially of a polymer or polymer precursor and oriented thermoplastic elastomeric fibers comprising the steps of:
(a) embedding said thermoplastic elastomeric fibers in said polymer or polymer precursor under from about 0 tension to tension only sufficient to eliminate slack; and
(b) hardening said polymer or polymer precursor to form a composite;
said polymer or polymer precursor being compatible with and adhesive to said thermoplastic elastomeric fibers, and forming, without said thermoplastic elastomeric fibers, a neat polymer matrix having an elongation of less than about 10%; and said thermoplastic elastomeric fibers being (a) capable of developing tension when embedded in said polymer or polymer precursor, and (b) present in said composite in an amount of from about 2 to about 95 percent by weight of composite.

22. A process as defined in claim 21, wherein the polymer is thermoplastic.

23. A process as defined in claim 21, wherin the polymer is selected from the group consisting of polystyrene, polymethyl methacrylate, cross-linked polymethyl methacrylate, polybutyl methacrylate, thermoplastic and thermoset polyester, copolymer of methyl methacrylate and butyl methyl methacrylate, copolymers of styrene and methyl methacrylate, and epoxy resin.

24. A process as defined in claim 23, wherein the polymer is selected from the group consisting of polystyrene, polymethyl methacrylate, and cross-linked polymethyl methacrylate.

25. A process as defined in claim 24, wherein the thermoplastic elastomeric fibers are embedded in the polymer or polymer precursor under tension only sufficient to eliminate slack.

26. A process as defined in claim 25, wherein the thermoplastic elastomeric fibers are selected from the group consisting of polyester elastomers, polyester/polyether elastomers, polyamide/polyester/polyether elastomers, polyester/polyurethane elastomers, polytetramethylene terephthalate, and polyester/polyurethane elastomers.

* * * * *